Feb. 19, 1957

M. W. THOMPSON 2,781,909

DIESEL OIL SEPARATOR

Filed Feb. 17, 1954

INVENTOR.
M. W. Thompson
BY
ATTORNEY

United States Patent Office 2,781,909
Patented Feb. 19, 1957

2,781,909

DIESEL OIL SEPARATOR

Malcolm W. Thompson, Tulsa, Okla., assignor to Warner Lewis Company, Tulsa, Okla., a corporation of Delaware Application February 17, 1954, Serial No. 410,820

4 Claims. (Cl. 210—43)

This invention relates to improvements in separators, and more particularly, but not by way of limitation, to an improved separator for removing water and debris from diesel oil.

When diesel oil is received by the consumer, it contains varying amounts of water and foreign matter, or debris, depending upon the care used by the refiner and transporter. Ordinarily the diesel fuel is used in the same condition as received, or it may be passed through a simple filtering device. In either event, the fuel retains a portion of the water and debris when introduced into the power unit.

As it is well known in the art, the injectors used in diesel engines are intricate mechanisms. And the slightest corrosion or foreign matter will frequently render them completely inoperable.

The present invention contemplates a novel separator for removing the maximum amount of water and debris from diesel oil—immediately prior to use, if desired. The contemplated separtor is small and of unitary construction (all of the elements are contained in one housing) to facilitate the use thereof in substantially any installation. The filtering and separating elements are constructed in such a manner that they may be easily and efficiently removed from the separator housing for cleaning or repair.

An important object of this invention is to remove the maximum water and debris from diesel oil, and preferably immediately prior to consumption of the oil.

Another object of this invention is to provide a novel separator, of unitary construction, for removing water and debris from diesel oil.

Another object of this invention is to provide a novel separator for removing water and debris from diesel oil and having easily removable filter and separating elements therein.

A further object of this invention is to provide a diesel oil separator adaptable for use in substantially any installation utilizing diesel oil.

A still further object of this invention is to provide a simply constructed diesel oil separator which may be economically manufactured.

Other objects and advantages of the invention will be evident from the following description, read in conjunction with the accompanying drawings, which illustrate my invention.

Figure 1:
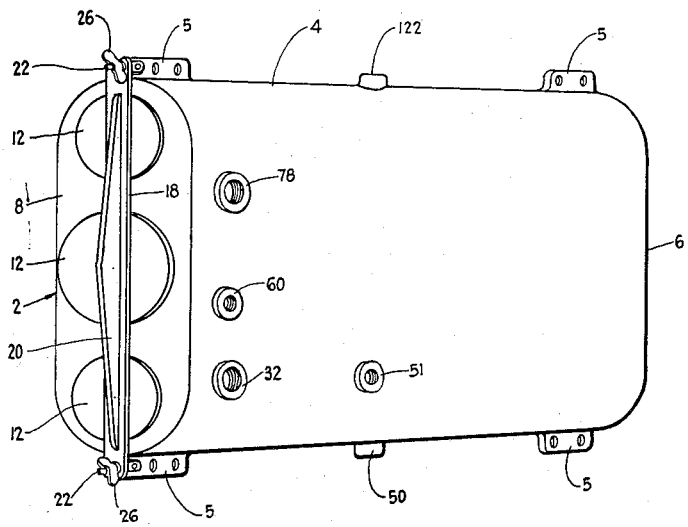
Figure 1 is a perspective view of my novel separator.
Figure 2:
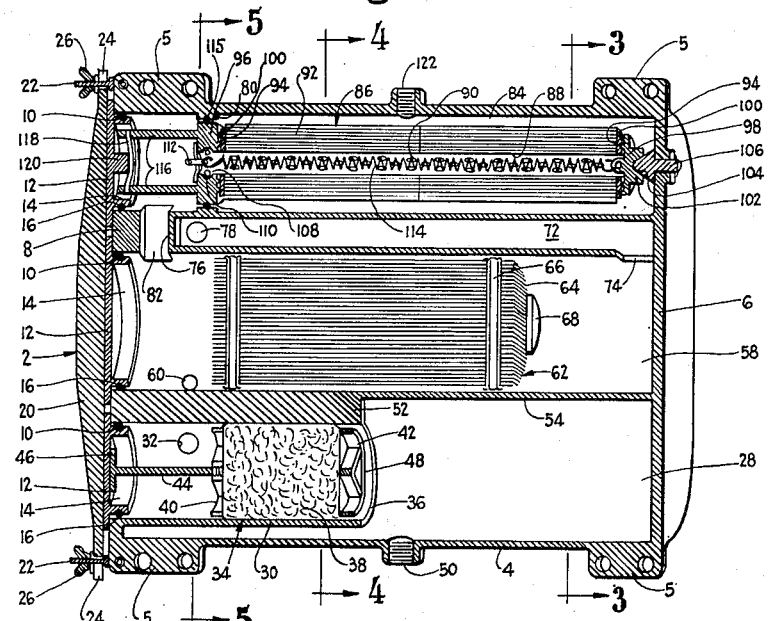
Figure 2 is a vertical cross-sectional view, partially in elevation, of the separator shown in Fig. 1 with the filtering and separating elements in operating position.
Figure 3:
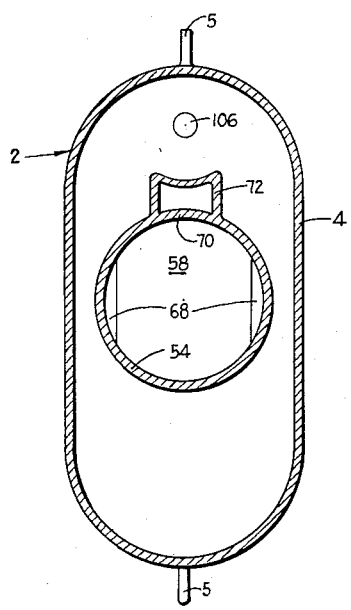
Figure 3 is a cross-sectional view of the separator as taken along line 3—3 of Fig. 2 with the filtering and separating elements removed.

Referring to the drawings in detail, and particularly Figs. 1 and 2, reference character 2 generally designates a novel separator comprising a substantially box-shaped housing 4 having outwardly extending apertured flanges 5 on the top and bottom at each end thereof to facilitate clamping the separator 2 in any desired installation (not shown). One end 6 of the housing 4 is permanently enclosed, and the opposite end 8 has three vertically spaced apertures 10 therein. Each aperture 10 is covered by a circular shaped plate 12 having an inwardly extending circumferential flange 14 thereon. The flanges 14 are sized to slide into the apertures 10 and each has a sealing ring 16 on the outer periphery thereof forming a seal with the housing 4. A bar 18, having a strengthening web 20 thereon, extends vertically over the plates 12. Threaded bolts 22 are pivotally secured to the apertured flanges 5 adjacent the end 8 of the housing 4 and are adapted to pivot on the flanges 5 in a vertical plane. The bolts 22 extend into vertical slots 24 provided at each end of the bar 18 and having wing nuts 26 on the outer ends thereof to engage the bar 18. Thus, the plates 12 may be easily and efficiently removed by unthreading the wing nuts 26, swinging the bolts 22 vertically out of the way and removing the bar 18.

Figure 4:
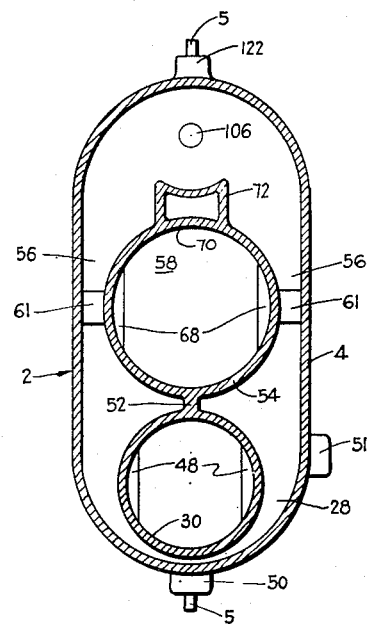
Figure 4 is a cross-sectional view of the separator as taken along lines 4—4 of Fig. 2 with the filtering and separating elements removed.
Figure 5:
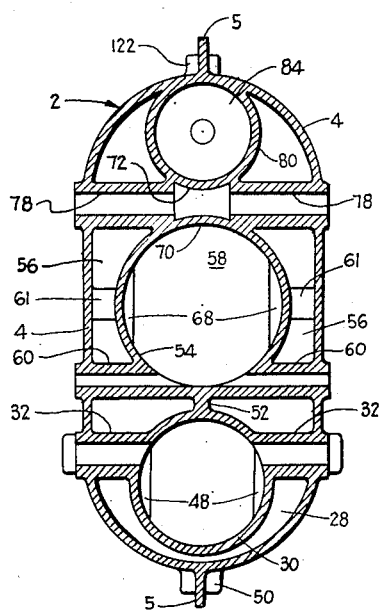
Figure 5 is another cross-sectional view of the separator as taken along lines 5—5 of Fig. 2 with the filtering and separating elements removed.

The lower interior of the housing 4 provides an initial separating and free water knock-out chamber 28. A tubular shaped support 30 (see also Figs. 4 and 5) extends horizontally in the chamber 28 from the housing end 8 through approximately one-half the length of the housing 4. The diameter of the support 30 is less than the width of the housing 4, and the support 30 is preferably, but not necessarily, formed integrally with the housing 4, as by casting. An inlet tube 32 extends transversely through each side of the housing 4 (see Fig. 5) and intersects the tubular support 30. The provision of two inlets 32 is merely for the purpose of facilitating installation of the separator 2. Either of thhe inlets 32 may be plugged or blanked off (not shown) if desired.

An excelsior unit generally indicated at 34 is disposed in the support 30 between the intersection of the inlets 32 and the inner end 36 of the support 30. The excelsior unit 34 comprises a cylindrical bundle of excelsior 38 having web type braces 40 and 42 at the opposite ends thereof to retain the bundle 38 intact. A rod 44 is threadedly secured in the central portion of the brace 40 and has a handled 46 on the outer end thereof. The length of the rod 44 is such to retain the handle 46 in contact with the lower plate 12 and the brace 42 in contact with a pair of holding lugs 48 provided in the inner end 36 of the support 30. It will be apparent that the threaded position of the rod 44 in the brace 40 will determine the compression imposed on the bundle 38.

A water outlet 50 is provided in the lower central portion of the housing 4 to discharge any water removed in the chamber 28. A second nozzle or outlet 51 is provided in the housing 4 above the outlet 50 to facilitate installation of a suitable float valve (not shown) for controlling the water level in chamber 28 if desired.

The support 30 is partially supported by a web or brace 52 extending lengthwise in the housing 4 and depending from a central tubular shaped support 54. The diameter of the tubular support 54 is also less than the width of the housing 4, thereby providing passageways 56 (see Figs. 4 and 5) between the support 54 and the side walls of the housing 4 communicating with the lower chamber 28, as well as a cylindrical chamber 58 out of communication with the lower chamber 28. The support 54 extends horizontally through the entire length of the housing 4 and has a pair of transverse water drain tubes 60 above the inlets 32 providing communication between the chamber 58 and the exterior of the housing 4. A pair of diametrically opposed arms 61 (Figs. 4 and 5) support the medial portion of the support 54 to the housing 4.

A baffle assembly generally indicated at 62 is disposed in the medial portion of the chamber 58. The baffle assembly 62 is constructed in the usual manner with a series of super-imposed plates 64 secured by vertical bolts and spacers 66. A pair of holding lugs 68 secured on the inner periphery of the support 54 in spaced relation to the housing end 6 retain the baffle assembly 62 in the position in the chamber 58.

The crown portion 70 of the support 54 forms the lower wall of a relatively small header 72 extending lengthwise in the housing 4. An aperture 74 in the crown portion 70 near the housing end 6 provides communication between the chamber 58 and the header 72. The header 72 extends from the housing end 6 into proximity with the housing end 8 where it is closed off by an end piece 76 as clearly shown in Fig. 2. A pair of transverse outlet tubes 78 extend outwardly from the header 72 adjacent the end 76 through the side walls of the housing 4.

A ring 80 extending downwardly from the top of the housing 4 above the outlet tubes 78 (see Fig. 5) assists in supporting the header 72. The ring 80 is of a length to extend from a point substantially directly above the outlet tubes 78 to the housing end 8. An aperture 82 is provided in the lower portion of the ring 80 between the end 76 of the header 72 and the housing end 8. The ring 80 forms one end of an upper chamber 84 positioned above the header 72.

A surface type filter unit generally indicated at 86 extends lengthwise in the chamber 84. The filter unit 86 comprises a center tube 88 having a plurality of transverse apertures 90 therein. A cylindrical body of filtering material 92, such as fiberglass, wound yarn, cotton, paper, pleated paper or the like, surrounds the center tube 88 and has a sealing plate 94 at each end thereof in sealing contact with the outer periphery of the center tube 88. The sealing plates 94 are formed out of any suitable sealing material, such as cork.

End plates 96 and 98 are positioned outwardly of the sealing plates 94. Each of the end plates 96 and 98 has a plurality of concentric circumferential flanges 100 on one end face thereof to engage the respective sealing plate 94. The end plate 98 is solid and has a projection 102 on the other end face thereof. A tapered recess 104 is provided in the outer end of the projection 102 to receive a tapered support member 106 in turn secured to the housing end 6. The support member 106 supports the respective end of the filter unit 86. It will be apparent that the end plate 98, cooperating with the sealing plate 94, seals off the respective end of the center tube 88 and prevents flow of fluid directly from the chamber 84 into the tube 88.

The tube 88 extends partially through an aperture 108 in the opposite end plate 96 and is sealed in the aperture 108 by a sealing ring 110. A bracket 112 is provided over the end of the tube 88 in contact with the outer face of the end plate 96 to receive one end of a tension spring 114. The spring 114 extends through the center tube 88 and the opposite end thereof is secured to the opposite end plate 98. Therefore, the spring 114 retains the end plates 96 and 98 in close contact with the sealing plates 94.

The end plate 96 is of a size to provide a sliding fit in the ring 80. Thus, the ring 80 provides support for the respective end of the filter unit 86. A sealing ring 115 on the outer periphery of the end plate 96 provides a seal with the ring 80 and prevents a flow of fluid around the end plate 96. A pair of bars 116 extend horizontally outward from the end plate 96 toward the housing end 8. A cross-bar 118 is secured at its opposite ends to the bars 116, and contacts a projection 120 provided on the inner face of the upper plate 12. When the filter unit 86 is inserted in the chamber 84 and the upper plate 12 is placed in operating position as shown in Fig. 2, the projection 120 contacts the cross-bar 118 and retains the end plate 98 in position on the tapered support 106.

An air vent 122 is provided in the top of the housing 4 to vent off any gases relieved in the separator 2.

*Operation*

As previously noted, diesel oil will contain varying amounts of water when received by the consumer. When the diesel oil contains what is termed a high water content (usually over one per cent of water), the separator 2 is assembled as shown in Fig. 2 with the filter units 34 and 86 and baffle assembly 62 in the positions shown.

The diesel oil mixture is injected through either or both of the inlets 32 into the left end (as shown in Fig. 2) of the chamber 28. The mixture first passes through the excelsior unit 34 where the larger debris is removed and a portion of the water content is coalesced into large globules. The mixture is then discharged into the open portion of the chamber 28 at the right hand end thereof where the free water is removed and gravitates to the bottom of the chamber 28 for subsequent removal through the water outlet 50.

The remaining diesel oil mixture, being lighter than the free water, rises in the chamber 28 and flows through the passageways 56 (see Figs. 4 and 5) around the center support 54 into the upper compartment 84. Since the ends of the center tube 88 are sealed off by the end plates 96 and 98, the mixture is forced to penetrate the filtering material 92 of the filtering unit 86 and flow through the apertures 90 into the center tube 88. The filtering material 92 performs a dual function in the separating process in that it filters minute debris from the diesel oil and coalesces the dispersed water remaining in the oil into larger droplets.

The mixture accumulating in the center tube 88 of the filter unit 86 is discharged through the end plate 96 into the left end of the upper chamber 84. The mixture then flows downwardly through the passageway 82 into the middle chamber 58 and passes through the baffle assembly 62. The baffle assembly 62 collects the water droplets formed by the filter unit 86 and provides the final separation of water from the oil. The water freed by the baffle assembly 62 collects in the lower portion of the middle chamber 58 and is discharged through the outlet tubes 60. The remaining diesel oil, after passing through the baffle assembly 62, flows upwardly through the aperture 74 into the header 72 and is discharged from the opposite end of the header 72 through the outlet tubes 78 ready for use.

In summary, it will be seen that with diesel oil containing an appreciable amount of water, the mixture passes first through the excelsior filter unit 34 and then through the free water knock-out section of chamber 28. At this stage of the process, the large debris or foreign matter and the larger portion of the water content will be removed. The mixture then flows upwardly through the passageways 56 around the middle chamber 58 into the upper chamber 84 and through the surface filter unit 86. The filter unit 86 removes the smaller foreign matter and coalesces the remaining water contained in the oil. Lastly, the mixture passes through the baffle assembly 62 for removal of substantially all of the remaining water.

Frequently diesel oil will contain only a small amount of water (less than one percent), giving the oil a cloudy appearance. When the oil is in this condition, the excelsior filter unit 34 may be removed from the separator 2. The oil mixture will then be injected directly into the knock-out portion of the chamber 28 for removal of the free water. The remainder of the separating process is identical to that described above for oil having a high water content. The knock-out step with the filter unit 86 and baffle assembly 62 are sufficient to remove such a small water content.

At anytime it is necessary to clean, repair or replace either of the filter elements 34 or 86, or the baffle assembly 62, it is simply necessary to remove the bar 18 and end plates 12 to gain access thereto. Each of the filter elements 34 and 86 is constructed to be removed as a unit to facilitate handling.

From the foregoing, it is apparent that the present invention provides a novel separator for removing water and debris from diesel oil which is unitarily constructed and may be utilized in substantially any installation using diesel oil. The saparator is simply constructed and all elements therein likely to need replacement or repair may be easily and efficiently removed.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A separator for removing water and debris from a diesel oil mixture, comprising a housing, a lower chamber in the housing, an inlet in the lower chamber for the diesel oil mixture, a knock-out chamber in the lower chamber communicating with said inlet for removing the free water from the mixture, an upper chamber in the housing in communication with the lower chamber, a surface type filter in the upper chamber communicating with the knock-out chamber to remove debris from the mixture and coalesce the remaining water in the mixture, a central chamber in the housing in communication with the upper chamber, a baffle assembly in the central chamber communicating with the surface type filter for removing the coalesced water, an outlet in the upper chamber for the separated water, and an outlet in the upper chamber for the diesel oil.

2. A separator for removing water and debris from a diesel oil mixture, comprising a housing, a lower chamber in the housing, an inlet in the lower chamber for the diesel oil mixture, an excelsior unit in the lower chamber communicating with said inlet, said excelsior unit comprising a cylindrical excelsior bundle, web type braces at each end of the bundle, and a handle threadedly secured to one of said braces for controlling the compression of the excelsior bundle, a knock-out chamber in the lower chamber communicating with the excelsior unit for removing the free water from the mixture, an upper chamber in the housing in communication with the lower chamber, a surface type filter unit in the upper chamber communicating with the knockout chamber, a middle chamber in the housing in communication with the upper chamber, a baffle assembly in the middle chamber communicating with the surface type filter to provide a final separation of water from the oil mixture, and outlets in the middle chamber for the separated water and diesel oil.

3. A seperator for removing water and debris from a diesel oil mixture, comprising a housing, a lower chamber in the housing, an inlet in the lower chamber for the diesel oil mixture, a knock-out chamber in the housing communicating with said inlet for removing the free water from the mixture, an upper chamber in the housing in communication with the lower chamber, a surface type filter in the upper chamber communicating with the knock-out chamber to remove debris from the mixture and coalesce the remaining water in the mixture, said surface filter unit comprising a center tube having a plurality of transverse apertures therein, a tubular shaped filter material telescoped over the center tube, sealing plates at each end of the filter material, and a spring extending through the center tube for retaining the sealing plates in contact with the opposite ends of the filter material, brackets removably supporting the surface filter unit in the housing, a middle chamber in the housing in communication with the upper chamber, a baffle assembly in the middle chamber communicating with the surface type filter for removing the coalesced water, an outlet in the middle chamber for the separated water and an outlet in the middle chamber for the diesel oil.

4. A separator for removing water and debris from a diesel oil mixture comprising a housing having an upper chamber, a central chamber, and a lower chamber, a filter media disposed in the lower chamber for separation of large debris particles from the oil mixture, an inlet in the lower chamber for admitting the oil mixture into contact with the filter media, a water knockout area in the lower chamber adjacent the filter media, drain means in the lower chamber for removal of water therefrom, passageway means providing communication between the lower chamber and the upper chamber, a second filter media in the upper chamber for separating small debris particles from the oil mixture, a second passageway providing communication between the upper chamber and the central chamber, a baffle assembly disposed in the central chamber to provide a final separation of water from the oil mixture, means for withdrawing the water from the middle chamber, and means for withdrawing the separated oil mixture from the middle chamber.

References Cited in the file of this patent

UNITED STATES PATENTS

| | | |
|---|---|---|
| 813,517 | Pfautz | Feb. 27, 1906 |
| 1,804,743 | Cannon | May 12, 1931 |
| 2,196,821 | Arnold | Apr. 9, 1940 |
| 2,248,992 | Holmes et al. | July 15, 1941 |
| 2,427,733 | McCann | Sept. 23, 1947 |
| 2,525,154 | Taylor | Oct. 10, 1950 |
| 2,649,964 | Taylor | Aug. 25, 1953 |